United States Patent [19]

Matsuo

[11] Patent Number: 5,007,783
[45] Date of Patent: Apr. 16, 1991

[54] POSITIONING APPARATUS FOR AN AUTOMATIC CARRIER SYSTEM

[75] Inventor: Sei Matsuo, Furukawa, Japan

[73] Assignee: Alps Electric Co., Ltd., Tokyo, Japan

[21] Appl. No.: 503,181

[22] Filed: Apr. 2, 1990

Related U.S. Application Data

[63] Continuation-in-part of Ser. No. 325,581, Mar. 17, 1989, abandoned.

[30] Foreign Application Priority Data

Jun. 2, 1988 [JP] Japan ................................ 63-134373

[51] Int. Cl.$^5$ ..................... B65G 21/20; B65G 67/02
[52] U.S. Cl. ................................. 414/222; 104/252; 198/465.1; 901/7
[58] Field of Search .................... 414/222; 901/7; 198/465.1; 104/252

[56] References Cited

U.S. PATENT DOCUMENTS

| | | | |
|---|---|---|---|
| 4,473,935 | 10/1984 | Tatsuura et al. | 198/465.1 |
| 4,532,869 | 8/1985 | Kondo et al. | 104/252 |
| 4,552,260 | 11/1985 | Teagno et al. | 198/465.1 |
| 4,646,649 | 3/1987 | Thatcher et al. | 104/252 |
| 4,674,181 | 6/1987 | Hamada et al. | 901/7 |
| 4,674,620 | 6/1987 | Inoue | 198/465.1 |
| 4,746,258 | 5/1988 | Loomer et al. | 414/222 |

*Primary Examiner*—David H. Brown
*Attorney, Agent, or Firm*—Guy W. Shoup; Paul J. Winters

[57] ABSTRACT

Disclosed is an automatic carrier system having one or more self-propelled robotic carriers for carrying products-in-assembly between assembly stations of an automated assembly line. The running speed and stopping position of individual carriers is controlled by command indicators. The carriers are capable of stopping within a small distance of a desired position relative to an assembly station. Each carrier supports a pallet upon which is slidably disposed a subpallet. Each assembly station has a robotic arm upon which is located a positioning member and an assembling tool. Accurate positioning of product-in-assembly is effected by lowering the positioning member, which comprises two cylinders with tapered openings, over a pair of positioning projections mounted on the slidable subpallets. As the positioning projections slide within the tapered opening of the positioning member cylinders, the sloped surface of the tapered opening causes the positioning projections to move toward the center of the cylinders. When the positioning member reaches its lowermost point, the positioning projections are centered in the cylinders, thus causing the subpallet and workpiece to be in the desired position relative to the assembling machine.

3 Claims, 8 Drawing Sheets

POSITIONING APPARATUS FOR AN AUTOMATIC CARRIER SYSTEM

REFERENCE TO RELATED APPLICATION

This application is a continuation-in-part of U.S. application Ser. No. 07/325,581, filed Mar. 17, 1989, now abandoned.

BACKGROUND OF THE INVENTION

1. Field of the Invention

This invention relates to an automatic carrier system and more particularly to a positioning apparatus for a carrier system for automatic assembling operations conducted by moving a workpiece-supporting carrier sequentially to automatic assembling machines located along an assembly line.

2. Description of the Prior Art

In a conventional automatic assembly line (for example, for the production of floppy disc) drives a number of product-supporting pallets are moved along a path by means of chains and/or belts. One or more automatic assembling machines, each having a part supplying unit, is provided along the path to assemble supplied components into combined products on the pallets. The products are carried in their complete and partially complete form.

Since automatic assembling operations normally require accurate positioning of the product carrying pallets relative to each assembling machine, a high degree of accuracy with regard to the positioning of the pallet relative to each assembling machine is required. In order to meet this requirement, the conventional assembly line uses chains and/or belts to move and position pallets; which makes the assembly line inflexible to change. Minor alterations of the assembly process can require drastic changes in the chain/belt based assembly system, causing considerable expense.

SUMMARY OF THE INVENTION

The present invention provides a positioning means for an automatic carrier system formed of plural component assembling machines linked to one another by rails. Self-propelled (robotic) carrier units move along the rails from one module to the next. The assembly system is operated by controlling the individual running speeds and stop positions of the robotic carriers as they transport products-in-assembly (workpieces) along the rails.

Fixed to the top of each robotic carrier is a pallet upon which is placed a subpallet having a pair of positioning projections. The subpallet is restricted to slide on the pallet over a short distance. Affixed to each subpallet are the products-in-assembly upon which assembling operations are carried out.

Each component assembling machine has a robotic arm capable of moving from a parts supply to a position over the rails. On each robotic arm is disposed a positioning mechanism made up of two vertical cylinders attached at one end to the robotic arm and having a tapered opening at the free end.

When a robotic carrier receives a signal to stop next to an assembling machine, the robotic carrier is capable of stopping within a very short distance of a desired position relative to the assembling machine. Once the robotic carrier is stopped, the robotic arm of the assembling machine is lowered toward the robotic carrier. The positioning member is thereby lowered over the positioning projections located on the subpallet. As the positioning member is lowered in a vertical direction, the tapered sides of the positioning member cause a horizontal force on the positioning projections, thereby causing the subpallet to slide relative to the pallet. When the positioning member reaches its lowermost position, the subpallet is properly positioned with respect to the assembling module; therefore, the product-in-assembly is properly positioned for assembling operations.

2 BRIEF DESCRIPTION OF THE DRAWINGS

The present invention will be described in greater detail by referring to the accompanying drawings which illustrate a preferred embodiment of the invention.

DETAILED DESCRIPTION OF THE INVENTION

Figure 7:
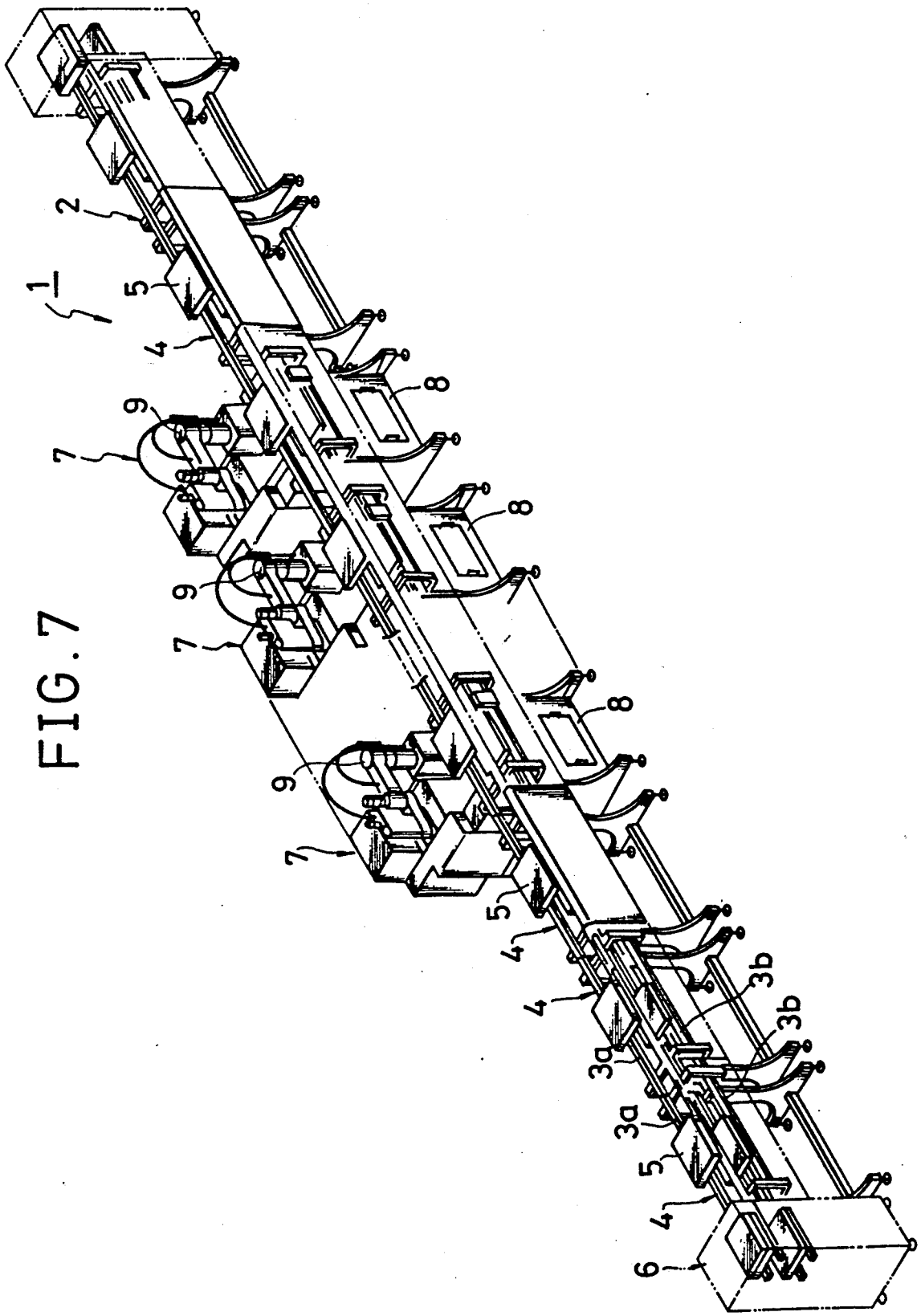
FIG. 7 is a perspective view of an assembly line using an automatic carrier system according to the invention.

In FIG. 7, reference numeral 1 generally denotes an assembly line for the production of floppy disc drives, for example. The assembly line 1 comprises an automatic carrier system 2. As illustrated in FIG. 7, the carrier system 2 comprises upper rails 3a for forward movement of parts, lower rails 3b for backward movement of parts, a plurality of self-propelled carriers 5 which automatically move on the upper and lower rails, 3a and 3b, and a pair of rail switching devices 6 respectively provided at the opposite ends of the line for changing the running direction of the carriers 5 by switching the carriers from the upper rails 3a to the lower rails 3b or vice versa. Between two successive forwarding units 4 of the carrier system 2 there is located an automatic product-assembling machine 7 which is mounted on a base section 8 and includes a multi-articular robotic arm 9.

Figure 1:
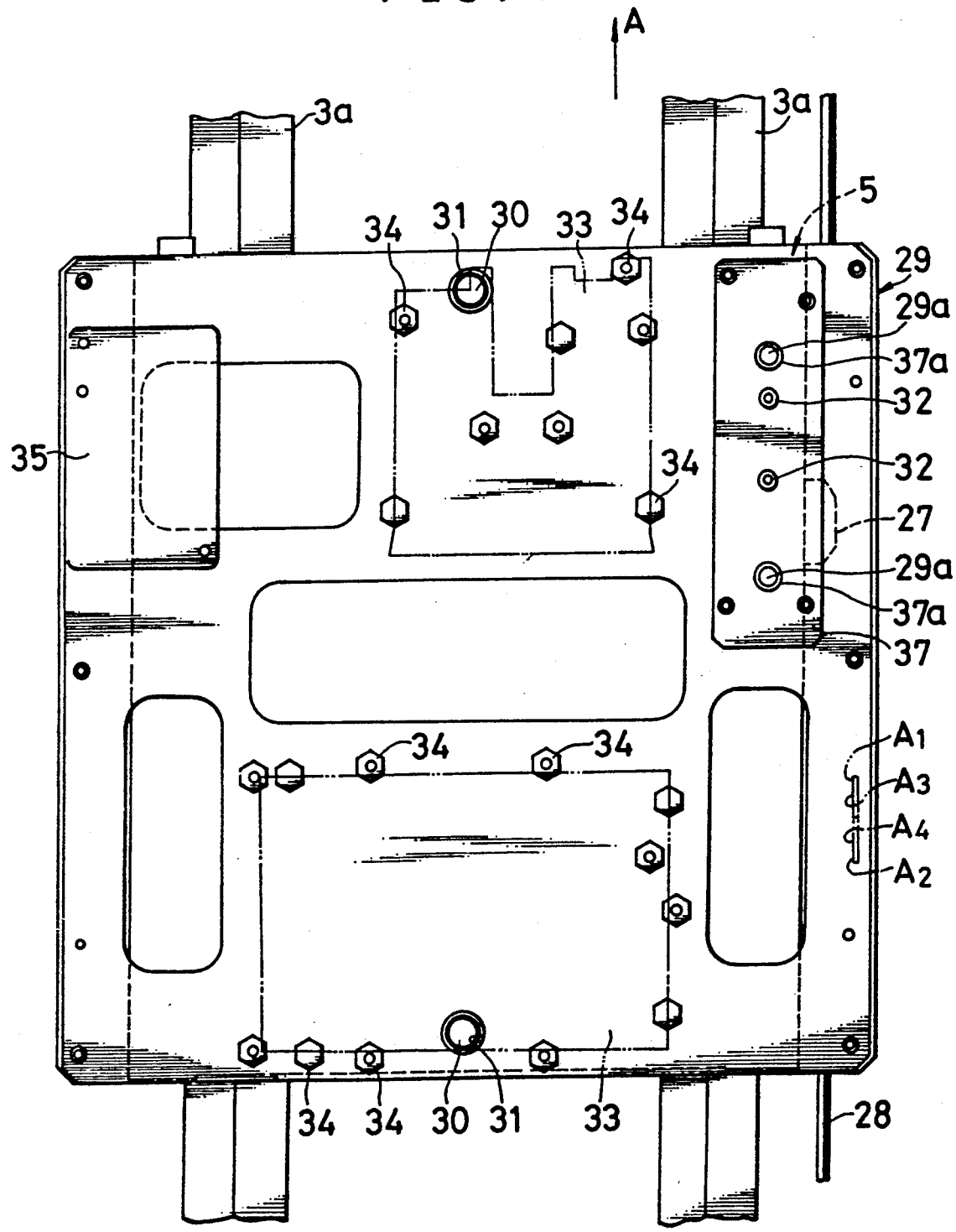
FIG. 1 is a plan view of a carrier supporting a pallet upon which is supported a subpallet according to the invention.
Figure 6:
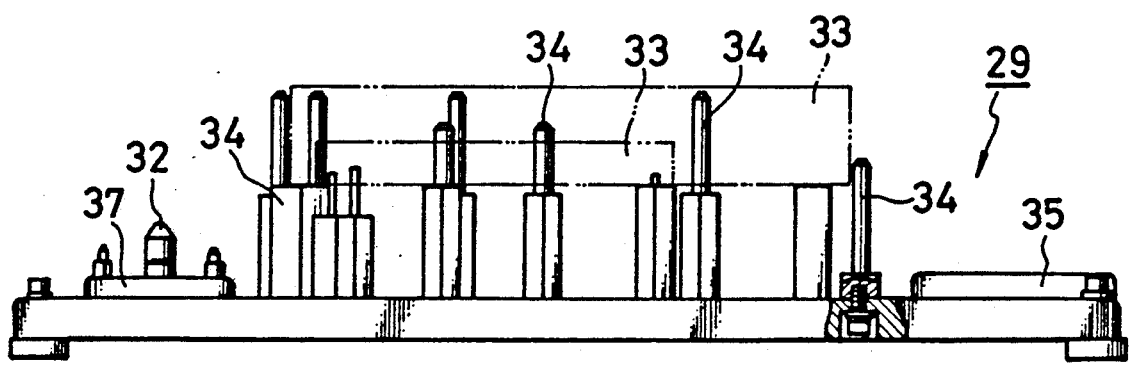
FIG. 6 is a front view of a pallet which may be carried on top of the carrier as as shown in FIG. 1.
Figure 8:
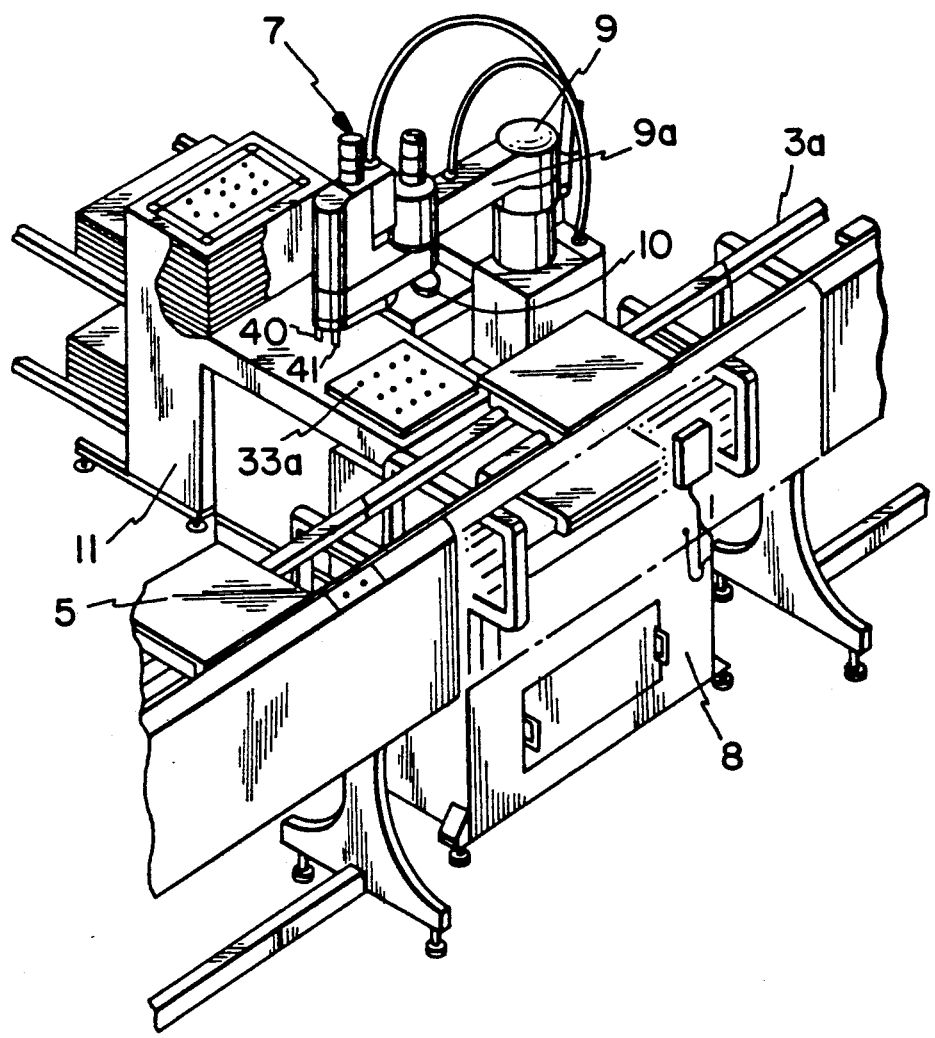
FIG. 8 is an enlarged perspective view of an automatic assembling machine installed in the assembly line of FIG. 7.

As shown in the close-up view of FIG. 8, the multiarticular robot arm 9 operatively engages with a tool replacer 10 which replaces removable tools 41 at a working end 9a of the robotic arm 9. A part supply unit 11 is provided in assembling machine 7 for supplying parts and components necessary to construct the product, i.e. a floppy disc drive apparatus. A positioning member 40 is located at the working end 9a of the robotic arm 9 for positioning the subpallet 32 with respect to the assembling machine 7. Referring to FIG. 6, the parts and/or components from part supply unit 11 are arranged on a subpallet 37 before subpallet 37 is placed on main pallet 29. Main pallet 29 is supported on a robotic carrier 5 as shown in FIG. 1.

Figure 4:
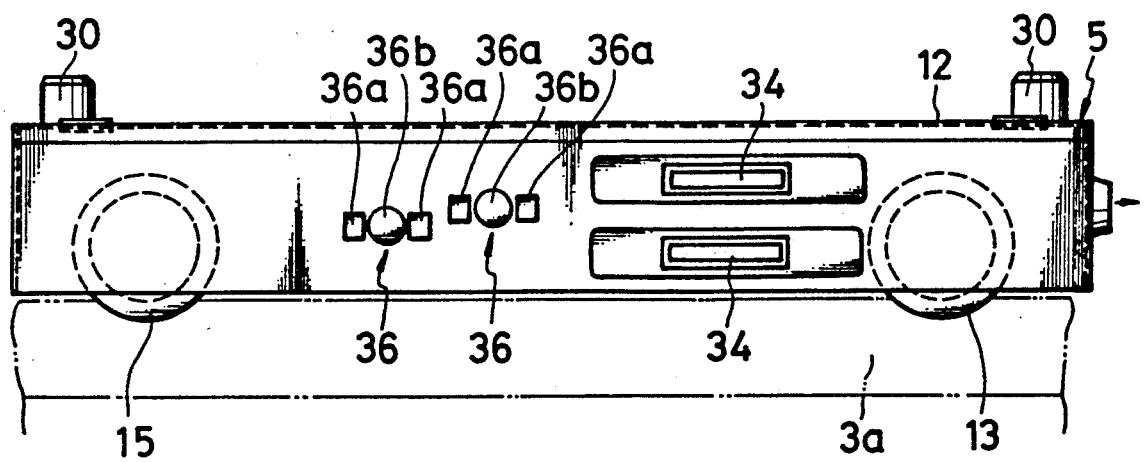
FIG. 4 is a side view of the robotic carrier.
Figure 3:
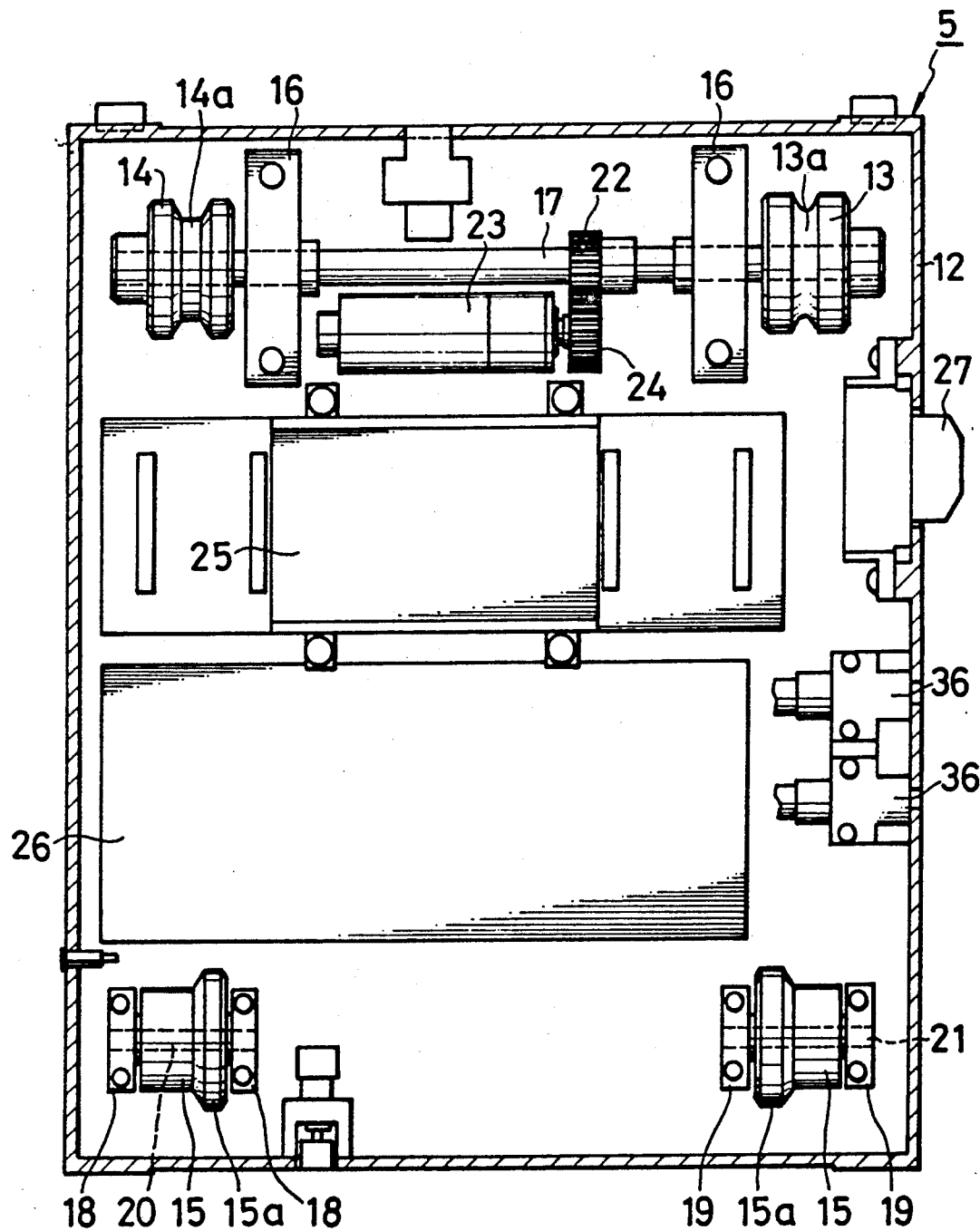
FIG. 3 is a partial cut-out plan view showing the interior of a robotic carrier according to the invention.
Figure 5:
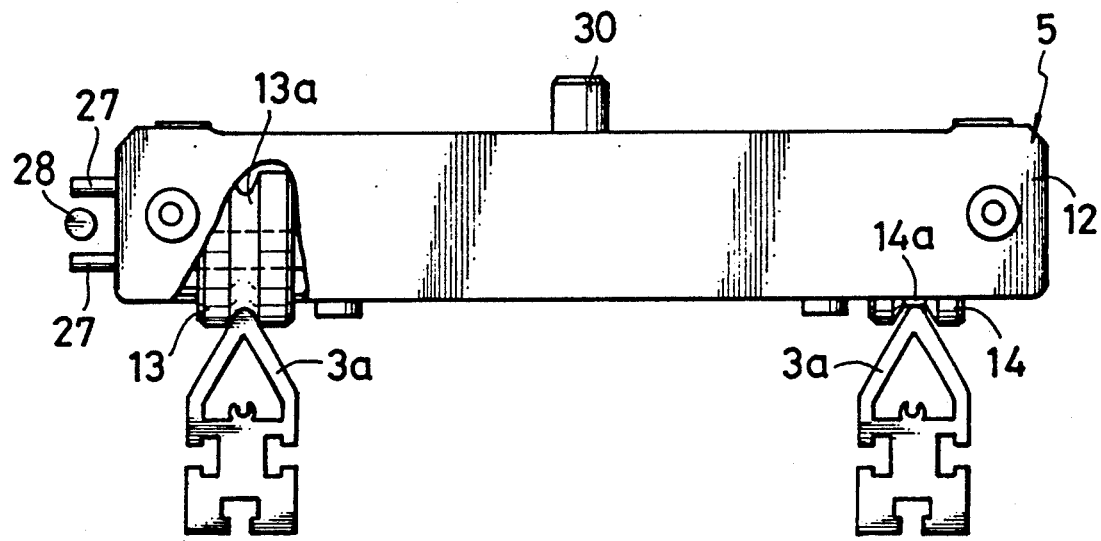
FIG. 5 is a partial cut-out front view showing the robotic carrier riding on rails.

As illustrated in FIGS. 3 through 5, the robotic carrier 5 is comprised of a rectangular case 12 having a relatively low profile. The case 12 is supported on front wheel pair, 13 and 14, and rear wheel pair 15 and aligned such that the wheels 13-15 come into engagement (FIG. 5) with upper rails 3a or lower rails 3b.

Figure 9:
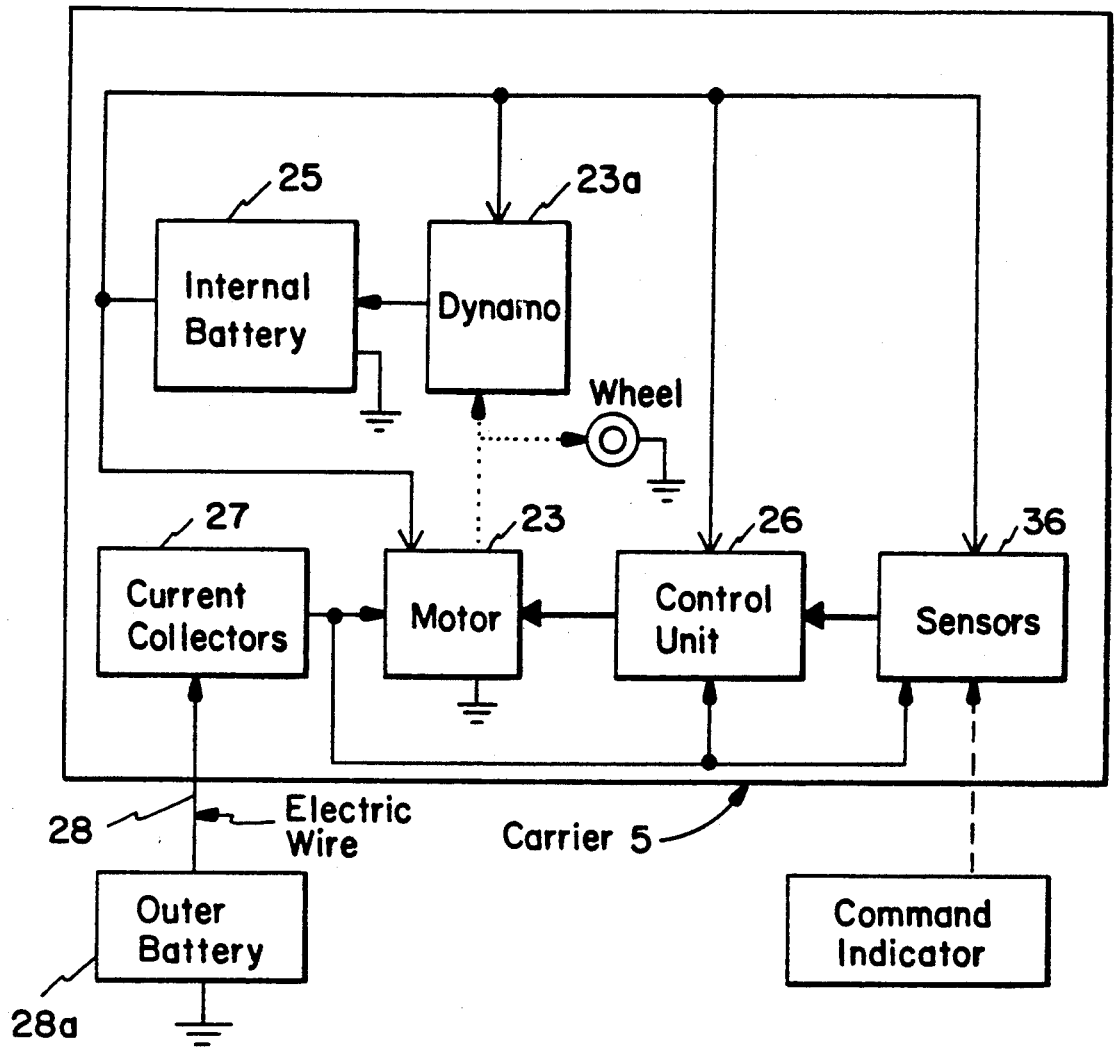
FIG. 9 is a wiring diagram of the robotic carrier.

FIG. 3 shows that front wheels 13, 14 are supported by a rotatable support shaft 17 held by brackets 16, 16, while the rear wheels 15, 15 are respectively rotatably supported by support shafts 20 and 21 held respectively by brackets 18 and 19. FIGS. 4 and 5 show that the wheels 13 through 15 are so arranged that they partially project below the lower surface of the case 12 so that they come into contact with the upper rails 3a or lower rails 3b. As shown in FIGS. 3 and 5, front wheel 13 has a V-shaped circumferential groove 13a which corresponds to the cross sectional top portion of the rails 3a and 3b, while the other front wheel 14 has a circumferential groove 14a having a truncated conical section allowing for some misalignment relative to the rails. Each of the the rear wheels 15, 15 has a flange 15a at a position which comes to engage against the insides of the rails 3a or 3b. The rear wheels 15, 15 are engaged with the rails 3a or 3b with a certain amount of play so that the carrier 5 can run on the rails 3a and 3b even if they are curved. Front wheels 13 and 14 are driven by electric motor 23 as shown in FIGS. 3 and 9. A gear 22 is rigidly fixed to the support shaft 17 and this gear 22 is engaged with a gear 24 fitted to the drive shaft of the motor 23. Motor 23 includes a dynamic section 23a for charging an internal battery 25.

The motor 23 receives a running speed control signal from an electronic control unit 26. The control unit 26 includes a microprocessor or like means for controlling the rotational velocity of the motor 23 in response to external commands received by optical sensors 36 or the like Electricity is supplied to the motor 23 from either the internal battery 25 or from an external power source 28a, depending upon whether the carrier 5 is located on the upper or lower rails, 3a or 3b.

FIG. 9 indicates the path of electrical power from the two sources 25 and 28a. When a carrier 5 is running on upper rails 3a, the external power source (outer battery) 28a charges a wire 28 (shown in FIG. 5) and this power is collected by a brush-type current collector 27 (or other power collecting means) and supplied to the motor 23 under control of velocity control unit 26. While in this configuration, the internal battery 25 is simultaneously charged by means of dynamo 23a which is driven by motor 28. When the carrier 5 is on lower rails 3b, the internal battery 25 provides power to the motor 23.

Figure 2:
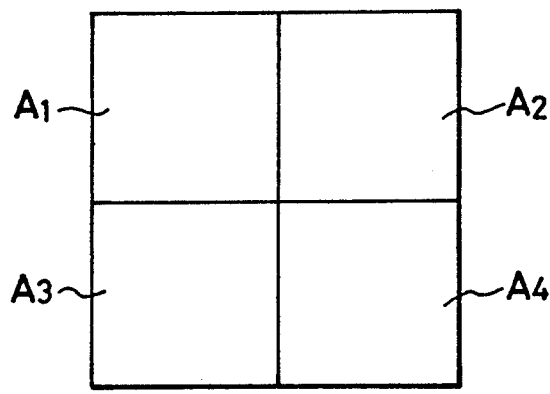
FIG. 2 is a block diagram of a bar-code type speed command indicator in accordance with the invention.

As seen in FIG. 4, a pair of sensor devices 36, 36 each comprising a light emitting unit 36a (not shown) and a light receiving unit 36b (not shown) are mounted on a side of the case 12 of the carrier 5. The sensors 36 optically detect a speed command signal coming from a visual speed command indicator provided on the carrier path so that the speed of the carrier 5 is controlled to a predetermined speed according to the speed command signal indicated by the indicator. Alternatively, the indicator may provide a stop command signal. Referring to FIG. 2, the speed command indicator is, for example, a pre-printed square which is divided into four small square areas to carry four different signal patterns A1, A2, A3 and A4 which can be bar-code patterns or differently colored areas, for example. As the pair of sensor devices 36, 36 scan the patterns A1, A2, A3 and A4, they detect a command signal represented by the four patterns A1, A2, A3 and A4 which are painted in four different ways. The detected signal is fed to the electronic control unit 26 (shown in FIGS. 3 and 9).

A main pallet 29, as shown in FIGS. 1 and 6, is placed on the upper surface of the case 12. The case 12 has a pair of anchoring projections 30, 30 on its upper surface, which are respectively inserted into a pair of matching bores 31, 31 formed in the pallet 29. The diameter of the bores 31, 31 is preferably made significantly larger than that of the projections 30, 30, so that the pallet 29 can freely move horizontally on the carrier 5. The pallet 29 further carries a subpallet 37 having a positioning projection 32. This projection 32 operatively engages with a positioning member 40 provided on the automatic assembling machine 7 so that the subpallet 37 can be moved on the pallet 29 to its correct position relative to the assembling machine 7. Holder pins 34, 34 are provided on the upper surface of the pallet 29 for positioning and securely holding a workpiece 33 (shown as a dashed rectangle) on it. An identification (ID) card is preferably also placed on the pallet 29 at position 35 to identify the pallet and/or the workpiece it supports.

As indicated in FIG. 5, when the carrier 5 is set on the upper rails 3a, the wheels 13, 14, 15 and 15 become engaged with the rails. Then the carrier 5 is externally powered by way of the current collector 27 and the electric wire 28 to move on the rails in the forward direction as indicated by arrow A (see FIG. 1). The rails 3a provide a ground return path. When the carrier passes a speed command indicator (FIG. 2), the sensor devices 36, 36 detect a signal which is formed by a combination of the four patterns A1, A2, A3 and A4 of the speed command indicator. The signal is then sent to the electronic control unit 26 and identified so that the motor 23 is controlled to drive the carrier 5 at the indicated speed or stop at a specified position. Since the speed command indicator is attached to the carrier path, the carrier 5 may be effectively controlled to move at an optimum speed on the path and to stop at a specified position having a specific relationship to an automatic assembling machine 7 within a small range of error.

Figure 10:
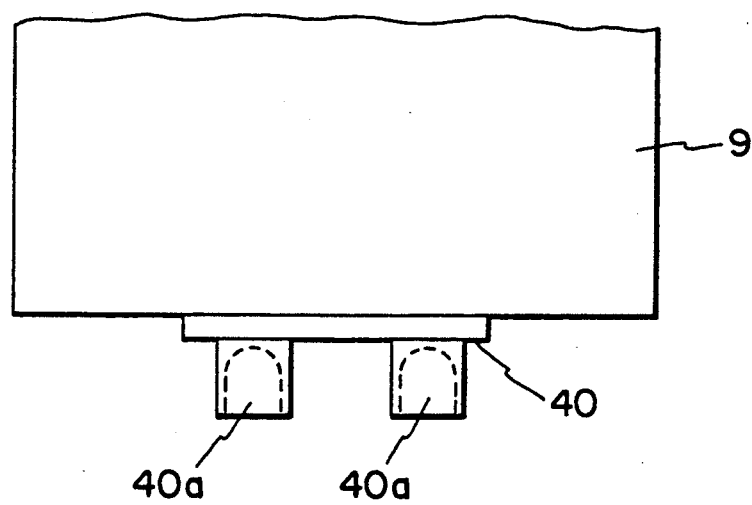
FIG. 10 is a partial cut-out view of the positioning member.

When the carrier 5 receives a command to stop next to an assembling machine 7, the carrier 5 stops within a very short distance of a desired position relative to the assembling machine 7. Once the carrier has stopped, the robotic arm 9 of the assembling machine 7 rotates to a position over the carrier 5. The working end 9a of the robotic arm 9 is then lowered toward the carrier 5. A positioned member 40, made up of two parallel vertical cylinders having a tapered opening (as shown in FIG. 10), is located on the working end 9a of the robotic arm 9. The size of the tapered openings is defined by the ability of the carrier 5 to stop within a short distance of the desired position relative to the assembling machine 7. That is, if the carrier 5 can stop within an inch in any direction from the desired position, then the maximum diameter of the tapered opening need only be approximately two inches. The diameter of the tapered opening becomes smaller inside of the cylinders. The deepest point of the tapered openings coincides with the longitudinal axis of the cylinders.

As the positioning member approaches the carrier 5, the surface of the tapered opening comes into contact with the positioning projections 32. The desired position of the subpallet 37 with respect to the assembling machine 7 is defined by the centermost portion of the tapered opening of the positioning member cylinders. Therefore, if the subpallet 37 is off-center when the positioning member comes into contact with the positioning projections 32, the positioning projections 32 will press against the slanted surface of the tapered opening of the positioning member cylinders 40. This contact will cause a horizontal force against the positioning projections 32, which in turn will cause the subpallet 37 to slide on the pallet 29 toward the centermost, deepest portion of the tapered opening of the positioning member cylinders. When the working end 9a of the robotic arm 9 is positioned at its lowermost position with respect to the carrier 5, the positioning projections 32 are repositioned to the centermost, deepest portion of the tapered openings and the subpallet 37 is in the desired position relative to the assembling machine 7.

Note that the movement of the subpallet 37 relative to main pallet 29 is possible because holes 37a, 37a formed in the subpallet 37 are loosely engaged with projections 28a, 29a provided on the main pallet 29 thereby allowing a considerable amount of play.

As soon as the subpallet 37 is correctly positioned relative to the automatic assembling machine 7, an assembling operation is started using the parts and/or components placed on the subpallet 37. When the operation is completed, and the components supported by subpallet 37 have been assembled into the product-in-assembly (workpiece) 33, subpallet 37 is removed and the carrier 5 automatically proceeds to the next assembling machine 7. A new subpallet 37 may be added midway between assembling machines 7, 7, ..............
In this manner, the carrier 5 sequentially moves to a series of automatic assembling machines 7, 7, ...... until the assembling operation of a floppy disc drive apparatus or other product 33 is completed.

With a carrier system configured as described above, in which there is provided on the carrier path a signal command indicator comprising four patterns A1, A2, A3 and A4 having different reflectivities, colors or other patternings to provide a speed command through a combination thereof and a carrier 5 comprising sensors 36 for detecting the signal, an electronic control unit 26 for controlling the running speed and stopping position of the carrier 5 according to a command signal detected by the sensors 36, a motor 23 controlled by said electronic control unit 26 and wheels 13, 14, 15 and 15 rotated by the driving force of the motor 23, the carrier can be effectively moved by the wheels 13, 14, 15 and 15 which run on rails 3a and 3b without using precisely positioned chains and/or belts as in the case of conventional systems. Accordingly, the robotic-carrier system disclosed here can be configured by using modular units and hence flexibly altered whenever necessary by altering the commanded motion of the robotic carriers and the overall cost of the assembly line can be significantly reduced. It should be noted that, since the carrier 5 carries a pallet 29 that can be freely moved on the carrier horizontally, as the pallet is loosely engaged with the projections 30, 30 of the carrier 5, and the pallet 29 carries a subpallet 37 which features a positioning projection 32 in such a manner that the subpallet 37 can be moved on the pallet 29 to correctly position itself relative to the automatic assembling machine 7, the subpallet 37 can be precisely positioned relative to the automatic assembling machine 7 for accurate and adequate assembling operations without requiring a high degree of precision of the stopping position of the carrier 5 on the carrier path and of the alignment of the pallet.

What is claimed is:

1. An apparatus for positioning a workpiece relative to an automatic assembling machine comprising:

a carrier disposed adjacent said automatic assembling machine, said carrier supporting a pallet, fixed to said carrier, and a subpallet, slidably mounted on said pallet, said subpallet having means for holding said workpiece, said subpallet also having at least two positioning projections;

a robotic arm disposed on said automatic assembling machine having a positioning member capable of moving into and out of contact with said positioning projections, said positioning member made up of at least two positioning cylinders having tapered openings at one end thereon, said tapered openings having a smallest diameter at the centers of said positioning cylinders;

wherein, when said carrier is placed such that said workpiece is positioned within a short distance of a desired position relative to said automatic assembling machine, said positioning member can be moved toward said carrier, and said positioning projections on said subpallet are engaged with said tapered openings of said positioning cylinders, said tapered openings causing said positioning projections to move toward the center of said tapered openings, thus causing said subpallet to slide on said pallet, thereby causing said workpiece to be disposed in said desired position relative to said automatic assembling machine.

2. A positioning apparatus of claim 1 wherein said carriers are self-propelled and capable of receiving speed and stop commands from and external source, said carriers travelling along a rail to said position adjacent said automatic assembling machine.

3. A positioning apparatus of claim 1 wherein said tapered opening defines a recess which is cup-shaped, the largest diameter of said tapered opening being defined by the position of the carrier relative to the automatic assembling machine.

* * * * *